US011804718B2

(12) United States Patent
Polcuch et al.

(10) Patent No.: US 11,804,718 B2
(45) Date of Patent: Oct. 31, 2023

(54) CONTROL SYSTEM FOR MULTIPLE ELECTRIC ACTUATION OF A VEHICLE

(71) Applicant: Parker-Hannifin Corporation, Cleveland, OH (US)

(72) Inventors: Eric A. Polcuch, Mission Viejo, CA (US); Andrew D. Momotiuk, Kalamazoo, MI (US); Alexandre J. Borreda, Lavalette (FR)

(73) Assignee: Parker-Hannifin Corporation, Cleveland, OH (US)

( * ) Notice: Subject to any disclaimer, the term of this patent is extended or adjusted under 35 U.S.C. 154(b) by 264 days.

(21) Appl. No.: 17/423,320

(22) PCT Filed: Feb. 24, 2020

(86) PCT No.: PCT/US2020/019482
§ 371 (c)(1),
(2) Date: Jul. 15, 2021

(87) PCT Pub. No.: WO2020/176405
PCT Pub. Date: Sep. 3, 2020

(65) Prior Publication Data
US 2022/0399723 A1   Dec. 15, 2022

Related U.S. Application Data

(60) Provisional application No. 62/811,110, filed on Feb. 27, 2019.

(51) Int. Cl.
*H02J 3/00*      (2006.01)
*H02J 3/46*      (2006.01)
*H02J 3/14*      (2006.01)

(52) U.S. Cl.
CPC .................. *H02J 3/46* (2013.01); *H02J 3/14* (2013.01); *H02J 2310/44* (2020.01)

(58) Field of Classification Search
CPC ..................... H02J 1/00; H02J 3/00
See application file for complete search history.

(56) References Cited

U.S. PATENT DOCUMENTS 4,356,402 A * 10/1982 Morimoto ............... H02J 9/08
307/85
4,659,942 A *  4/1987 Volp ....................... G06F 1/30
307/42

(Continued)

FOREIGN PATENT DOCUMENTS

| EP | 1803644 | 7/2007 |
|---|---|---|
| EP | 1897804 | 3/2008 |
| EP | 2838192 | 2/2015 |

OTHER PUBLICATIONS

International Search Report and Written Opinion issued by WIPO for corresponding International Patent Application No. PCT/US2020/019482 dated May 12, 2020.

(Continued)

*Primary Examiner* — Adi Amrany
(74) *Attorney, Agent, or Firm* — Renner, Otto, Boisselle & Sklar, LLP

(57) ABSTRACT

A control system includes a plurality of subsystems each operative to perform a unique vehicle function, a plurality of electronic controllers each operative to individually control at least one of the plurality of subsystems, wherein a number of subsystems is greater than a number of controllers, and a plurality of switching devices each operative to selectively connect any one of the plurality of subsystems to any one of the plurality of electronic controllers.

20 Claims, 7 Drawing Sheets

(56) References Cited

U.S. PATENT DOCUMENTS

| | | | | | |
|---|---|---|---|---|---|
| 4,967,096 | A | * | 10/1990 | Diemer | F02N 11/04 307/45 |
| 6,018,233 | A | * | 1/2000 | Glennon | B60L 15/20 290/36 R |
| 7,439,634 | B2 | * | 10/2008 | Michalko | H02J 4/00 307/66 |
| 7,939,962 | B2 | * | 5/2011 | Foch | H02J 4/00 307/19 |
| 2007/0145180 | A1 | * | 6/2007 | Johnson | B64C 13/50 244/13 |
| 2014/0097290 | A1 | * | 4/2014 | Leng | B64C 11/46 244/6 |
| 2015/0084561 | A1 | | 3/2015 | Benson et al. | |
| 2018/0339790 | A1 | | 11/2018 | Huang | |
| 2020/0164995 | A1 | * | 5/2020 | Lovering | B64D 31/06 |
| 2020/0231047 | A1 | * | 7/2020 | Demont | H02P 29/028 |

OTHER PUBLICATIONS

International Search Report and Written Opinion issued by WIPO for corresponding International Patent Application No. PCT/US2020/019482 dated Jan. 26, 2021.

\* cited by examiner

CONTROL SYSTEM FOR MULTIPLE ELECTRIC ACTUATION OF A VEHICLE

RELATED APPLICATIONS

This application is a national phase of International Application No. PCT/US2020/019482 filed Feb. 24, 2020, which claims benefit of U.S. Provisional Application No. 62/811,110 filed Feb. 27, 2019, the contents of which are incorporated here by reference.

FIELD OF INVENTION

The present invention relates to electric actuator driven systems and, more particularly, to a device and method for reducing the number of electronic controllers utilized to power actuator driven systems of a vehicle while maintaining full system functionality, reliability, availability, and redundancy.

BACKGROUND OF THE INVENTION

Modern aircraft are increasingly using electric actuation as an alternative to conventional hydraulic actuation. Frequently these aircraft utilize three phase alternating current (AC) power buses with varying frequencies (wild frequency) depending on operating condition. For many motor driven systems this wild frequency limits the suitability of simple AC induction motors to be used directly through motor control relays. Further, directly connecting many of these systems to the supply power through a simple switch method may result in high current draw and poor power factor, which may negatively affect the power bus. As such increasingly it is necessary to use electronically controlled motors to provide proper current, speed, and position control as well as power bus power factor control. Further, systems not requiring frequency control may require voltage control, these may include devices such as resistive heaters, lighting and similar systems and subsystems. Typically, these systems that required some type of controlled electric power use dedicated electronic controllers for each motor, actuator, or subsystem and, as such, the high number of electronic controllers increases standby power consumption and can become a cost, weight, envelope and reliability concern.

SUMMARY OF THE INVENTION

A device and method in accordance with the present invention reduces the number of electronic controllers utilized to control various vehicle motor, actuator, or other systems and subsystems, while providing a high level of redundancy, reliability and availability of the associated controlled systems. More particularly, the device and method in accordance with the invention enable multiple vehicle subsystems to be selectively driven by any one of a number of electronic controllers, where the number of multiple electronic controllers may be more or less than the number of subsystems. The subsystems can be selectively connected to any one or more of the electronic controllers, for example, through bus transfer switches, solid state power controllers (SSPCs) or the like. This approach allows each subsystem to be selectively connected to different electronic controllers such that a single or even dual electronic controller failure does not result in loss of the subsystem. The device and method in accordance with the invention is further advantageous in that not only does it reduce the total number of electronic controllers utilized on the vehicle, but also the amount of wiring, wire harnesses and connectors utilized in the vehicle, which can result in weight and cost savings and reliability improvements.

According to one aspect of the invention, a control system includes: a plurality of subsystems each operative to perform a unique function; at least one controller operative to individually control at least one of the plurality of subsystems; and a plurality of switching devices each operative to selectively connect at least one of the subsystems to any one of the at least one controller.

In one embodiment, a high-level controller is operatively coupled to the plurality of switching devices, the high-level controller configured to selectively command the plurality of switching devices to connect any one of the plurality of subsystems to any one of the at least one controller.

In one embodiment, the control system includes a plurality of input power sources and a plurality of input switching devices, each operative to selectively connect at least one of the at least one controller to an individual input power source of the plurality of input power sources, each controller coupled to the plurality of input power sources via a number of input switching devices corresponding to a number of input power sources.

In one embodiment, the high-level controller is operatively coupled to the plurality of input switching devices, the high-level controller configured to selectively command the plurality of input switching devices to connect the at least one controller to any one of the plurality of input power sources.

In one embodiment, a number of subsystems is greater than a number of controllers.

In one embodiment, a number of subsystems is equal to or less than the number of controllers.

In one embodiment, the control system includes a high-level controller operatively coupled to the plurality of switching devices, the high-level controller configured to selectively command the plurality of switching devices to connect any one of the plurality of subsystems to any one of the at least one controller.

In one embodiment, the high-level controller is directly coupled to each of the plurality of switching devices and each of the plurality of input switching devices.

In one embodiment, the high-level controller is indirectly coupled to each of the plurality of switching devices and each of the plurality of input switching devices.

In one embodiment, the high-level controller is communicatively coupled to at least one of the plurality of controllers, and at least one controller is directly coupled to at least one of the switching devices.

In one embodiment, the high-level controller comprises a flight control computer.

In one embodiment, the high-level controller is communicatively coupled to the plurality of controllers and configured to provide control parameters to each controller based on the subsystem connected to the respective controller.

In one embodiment, the high-level controller comprises a plurality of high-level controllers.

In one embodiment, the plurality of subsystems comprises at least one of a thrust reverser, a leading-edge slat; a trailing edge flap, a spoiler, wing fold, cargo door, a landing gear door, an electrically actuated component, or other subsystem.

In one embodiment, the controllers comprise a motor drive controller.

In one embodiment, the motor drive controller comprises a variable frequency AC motor drive, a brushless DC drive, or other motor drive type.

In one embodiment, the plurality of transfer switches comprises at least one of a solid-state switch or an electro-mechanical relay.

In one embodiment, the control system includes a vehicle.

In one embodiment, the vehicle comprises an aircraft, a land-based vehicle, or a water-based vehicle.

According to another aspect of the invention, a method is provided for controlling a plurality of subsystems on a vehicle using a plurality of electronic controllers, wherein a number of electronic controllers on the vehicle is less than a number of subsystems on the vehicle. The method includes selectively connecting any one of the plurality of subsystems to any one of the one or more controllers.

In one embodiment, a plurality of switching devices of the vehicle are each operative to selectively connect any one of the plurality of subsystems to any one of the at least one controller, and wherein selectively connecting comprises using a high-level controller to selectively command the plurality of switching devices to connect any one of the plurality of subsystems to any one of the at least one controller.

In one embodiment, a plurality of input switching devices are each operative to selectively connect any one of the plurality of input power sources to each of the plurality of electronic controllers, and wherein selectively connecting further comprises using the high-level controller to selectively command the plurality of input switching devices to connect any one of the plurality of input power sources to each of the plurality of electronic controllers.

In one embodiment, selectively connecting includes connecting any one of a plurality of input power sources to any one of the plurality of electronic controllers.

In one embodiment, using the high-level controller includes the high-level controller directly commanding each of the plurality of switching devices and each of the plurality of input switching devices.

In one embodiment, using the high-level controller includes the high-level controller indirectly commanding each of the plurality of switching devices and each of the plurality of input switching devices.

In one embodiment, the method includes providing control parameters to each electronic controller based on the subsystem connected to the respective electronic controller.

According to another aspect of the invention, a controller for controlling a plurality of subsystems on a vehicle using one or more electronic controllers, wherein a number of electronic controllers on the vehicle is less than a number of subsystems on the vehicle, and wherein a plurality of switching devices of the vehicle are each operative to selectively connect any one of the plurality of subsystems to any one of the one or more electronic controllers is provided. The controller includes logic configured to command the plurality of switching devices to selectively connect any one of the plurality of subsystems to any one of the one or more electronic controllers.

According to another aspect of the invention, a control system includes a plurality of subsystems, each operative to perform a unique function; a controller operative to individually control at least one of the plurality of subsystems; a first switching device coupled to the controller and configured to couple to a first input power source; and a second switching device coupled to the controller and configured to couple to a second input power source.

These and other features of the invention are more fully described and particularly pointed out in the description and claims set out below, and this Summary is not intended to identify key features or essential features of the claimed subject matter. The following description and claims and the annexed drawings set forth in detail certain illustrative embodiments of the invention, and these embodiments indicate but a few of the various ways in which the principles of the invention may be used.

DETAILED DESCRIPTION

Figure 1A:
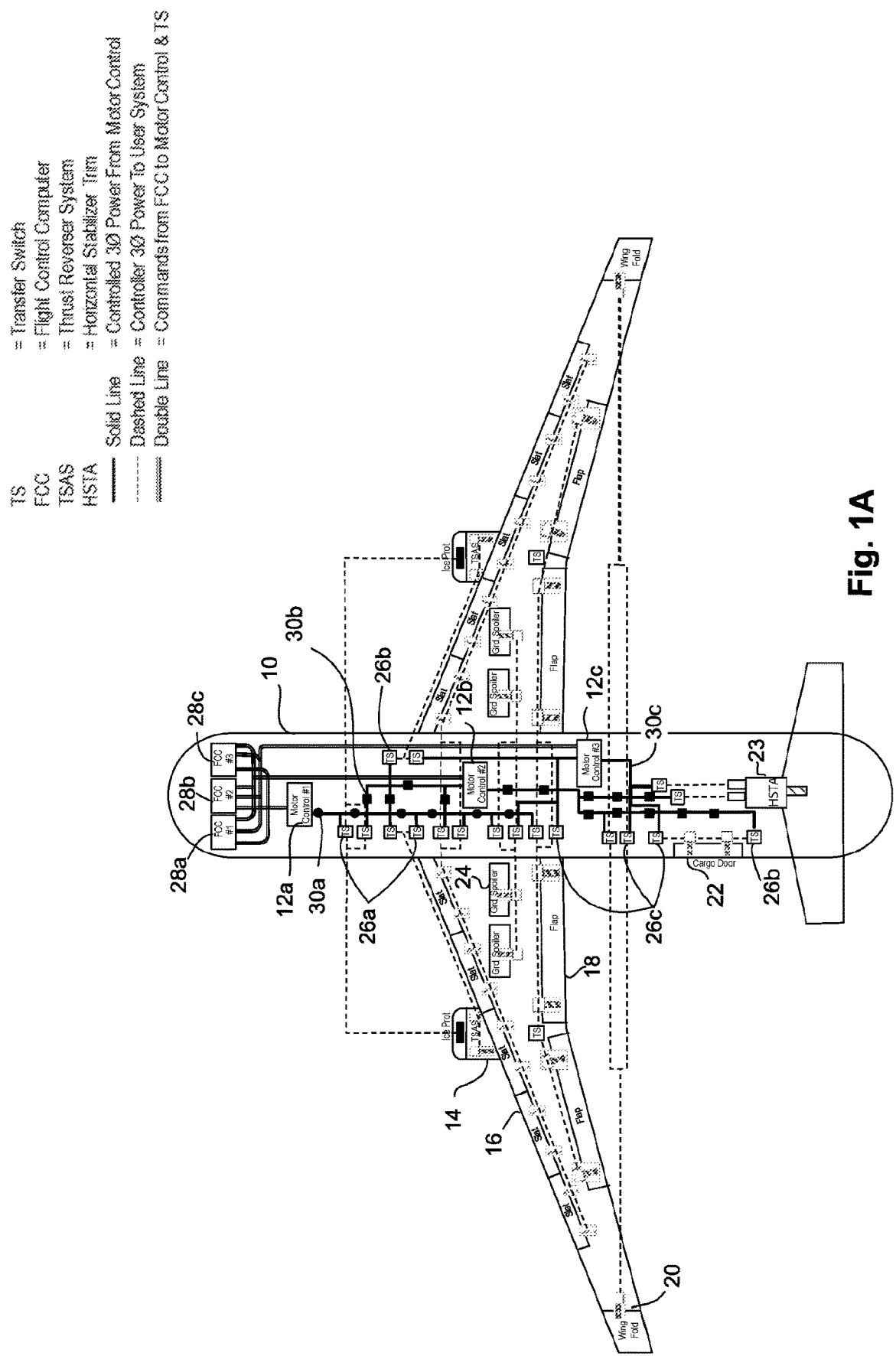
FIG. 1A is schematic diagram of an aircraft illustrating a system for powering multiple actuators on an aircraft via a smart grid in accordance with the present invention.

The present invention is described in the context of aircraft subsystems driven by one or more AC induction motors, where the aircraft includes at least two independent subsystems each driven by one or more motors. In such subsystems, the speed and/or position control of the subsystem relies on low-slip induction motors closely following a specified Volts per Frequency (V/F) profile in an open loop manner. It should be appreciated, however, that aspects of the invention have utility in other types of systems. For example, the invention is applicable to brushless DC motor driven systems as well as brushed DC motor driven systems and the like. Further, aspects of the invention are applicable to vehicles other than aircraft, including maritime (e.g., ships) and land vehicles (e.g., tanks) as well as industrial/agricultural systems.

There are many subsystems on board typical commercial aircraft that could benefit from near synchronous induction motor technology as described in U.S. Pat. No. 9,190,942, many of which operate during different phases of aircraft operation. Generally, the plurality of subsystems on board typical commercial aircraft each performs a unique function. Because the subsystems perform unique functions, their operation is often mutually exclusive. The device and method in accordance with present invention take advantage of the mutually exclusive operation of certain subsystems. In this regard, multiple subsystems share one or more electronic controllers by selectively connecting each subsystem to any one of a plurality of electronic controllers at the time of operation. As used herein, the term "electronic controller" is defined as any circuitry, power component(s) and/or electronic module(s), or combination thereof, that provide electric current and voltage to an AC induction motor, or other motor, in order to control operation of the motor and attached equipment.

The subsystems can be selectively connected to any one of the electronic controllers using, for example, transfer switches. Such transfer switches may be any type of switching device that can selectively provide an electrical connection capable of carrying the power required by the subsystem. In one embodiment, the transfer switch is embodied as an electro-mechanical relay (e.g., an electrical contactor). In another embodiment, the transfer switch is embodied as a solid-state switching device. The term transfer switch is not intended to denote a single switching device, but is intended to encompass any switch, relay, device, and/or combination of devices that can selectively provide an electrical connection capable of carrying the power required by the subsystem.

The input power to the electronic controllers may also be selectively applied to the controller based on availability of any one of several power sources using similar transfer switches. Likewise, the electric power source can be removed from an electric controller not required or desired to be operated, such as in the event of an electronic controller failure.

Figure 1B:
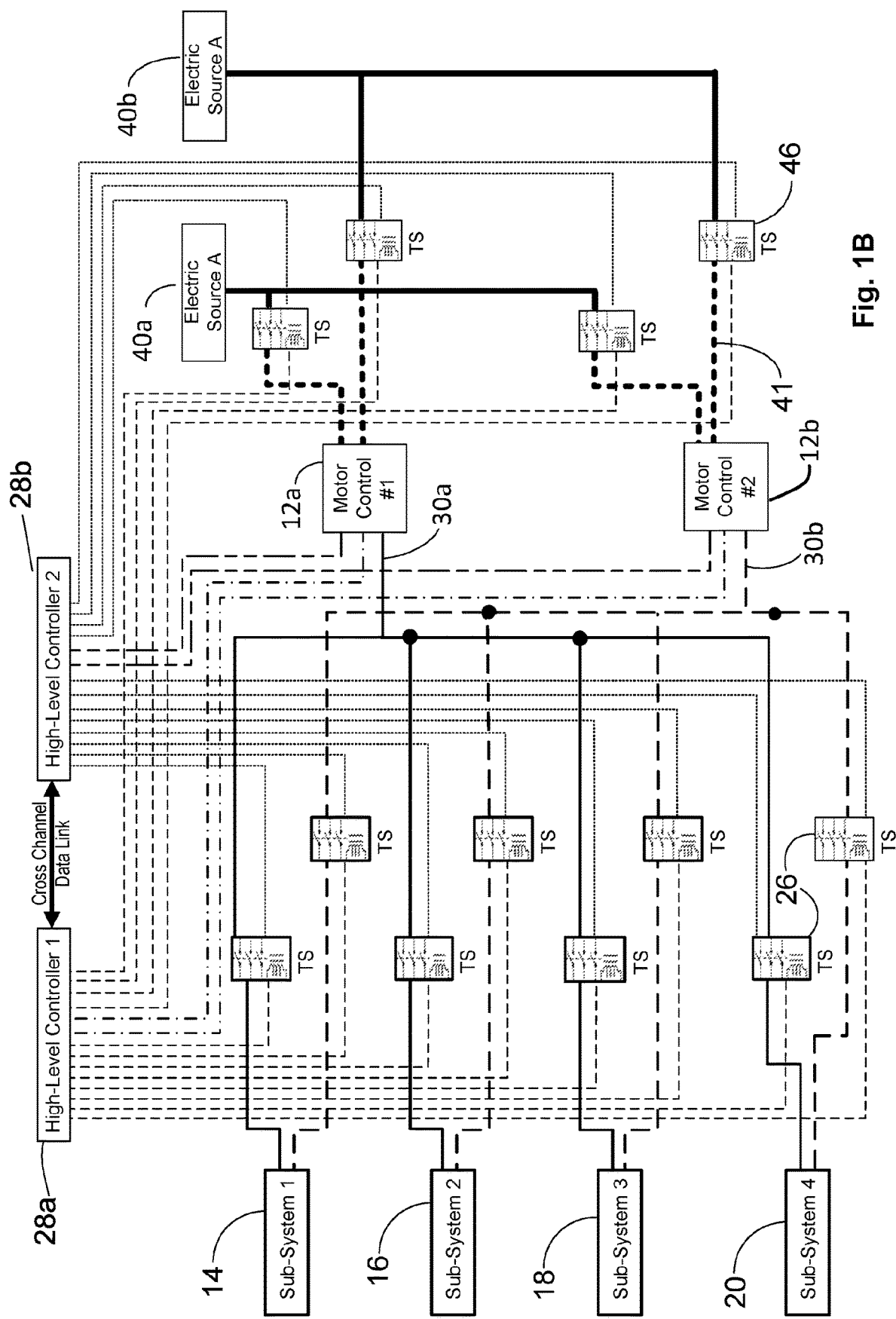
FIG. 1B is a block diagram of an exemplary smart grid including power sources, high level controllers, motor controllers, sub-systems, and transfer switches.

Referring now to exemplary embodiments, FIG. 1A and FIG. 1B is a schematic diagram of an aircraft illustrating a system for powering multiple actuators on an aircraft via a smart grid in accordance with the present invention. The aircraft 10 has multiple subsystems powered by a group of electronic controllers 12a, 12b, 12c (referred to generally as electronic controllers 12). Although not shown in FIGS. 1 and 2, each subsystem includes one or more electric motor driven systems which could include actuators, pumps, fans, conveyors, and other types of motor drive systems. In the exemplary embodiment the electronic controllers 12 are motor controllers such as, for example, variable frequency AC motor drives. It will be appreciated that other types of electronic controllers may be utilized depending on the specific application (e.g., the electronic controller may be a brushless motor controller when the actuators use brushless DC motors).

While three electronic controllers 12 are illustrated, more or fewer electronic controllers may be utilized without departing from the scope of the invention. For redundancy purposes, it is preferable that at least two electronic controllers 12 are connectable to each subsystem to enable full system operation in the event one electronic controller 12 fails.

In the exemplary embodiment illustrated in FIG. 1A and FIG. 1B, the subsystems may perform a unique function and include thrust reversers 14, leading edge slats 16, trailing edge flaps 18, wing folds 20, cargo doors 22, horizontal stabilizer trim actuator (HSTA) 23, spoilers 24, landing gear doors, and the like. Subsystems may include any electrically actuated component on an air, land, or sea vehicle that may be configured to operate with a controller 12. The aircraft 10 or other vehicle may include more or fewer subsystems depending on the specific application or applications other than aircraft. At least some of the subsystems operate during different intervals. The operation of certain subsystems is mutually exclusive from that of other subsystems. For example, the thrust reversers 14 and ground spoilers 24 operate post aircraft touchdown in order to provide a braking function and/or downward force on the aircraft, but never operate during takeoff, cruise or landing approach. The trailing edge flaps 18 and leading-edge slats 16 may operate during aircraft pre and post take-off phase and during a pre-touchdown landing phase but are not needed until after ground spoiler and thrust reverser operation. The slat and flap operations are typically staggered in time with slat extending first and retracting last. The wing folds 20 and cargo doors 22 may be operated only when the aircraft is on the ground either during taxi or not in service (i.e., when the aircraft is stationary), and never during takeoff, cruise or landing. HSTAs 23 are used during flight but not ground.

The electronic controllers 12a, 12b, 12c are coupled to each subsystem via a respective transfer switch 26. In this regard, each transfer switch 26 is operative to electrically connect and disconnect a subsystem to/from an electronic controller 12a, 12b and 12c. By using multiple transfer switches 26, a number of subsystems N can be selectively connected to any one of a number of electronic controllers M. In one embodiment, the number of electronic controllers M is less than the number of subsystems N (M<N). For example, a single electronic controller (M=1) can be selectively and independently connected to five subsystems (N=5) by controlling the state of the transfer switch 26 associated with each subsystem. In another embodiment, the number of electronic controllers M is equal to or greater than the number of subsystems N (M≥N). For example, each of three electronic controllers 12 (M=3) can be selectively and independently connected to one or more subsystems (N>=1) via transfer switches associated with the respective subsystems and/or electronic controllers 12. Preferably, each transfer switch 26 is operated when the corresponding subsystem is not operating (powered off), which improves the reliability and availability of the transfer switches 26. Operating the transfer switch when the corresponding subsystem is not operating also improves power line stability. For example, transfer switches may offer the ability to provide inrush current limiting that further enhances power line stability.

As seen in FIG. 1A and FIG. 1B, a first electronic controller 12a is electrically connected to an input of a first group 26a of transfer switches 26 via conductors 30a, a second electronic controller 12b is electrically connected to an input of a second group 26b of transfer switches 26 via conductors 30b, and a third electronic controller 12c is electrically connected to an input of a third group 26c of transfer switches 26 via conductor 30c. The output of each transfer switch 26 associated with each electronic controller 12 is electrically connected to a respective subsystem. Thus, in the embodiment shown in FIG. 2 each subsystem may be connected to three different transfer switches 26 (one transfer switch for each electronic controller 12a, 12b, 12c). Such configuration enables, for example, each subsystem to be connected to any one of the electronic controllers 12a, 12b or 12c to control operation of the respective subsystem.

Communicatively coupled to each electronic controller 12 is a plurality of high-level controllers 28a, 28b, 28c, referred to as a Flight Control Computer, that oversee operation of the system. Voting of commands issued by high-level controllers 28a, 28b, 28c may be employed by each electronic controller 12 to guard against failure of one of the high-level controllers 28. Each electronic controller 12 may be coupled to a plurality of input power sources.

Figure 1C:
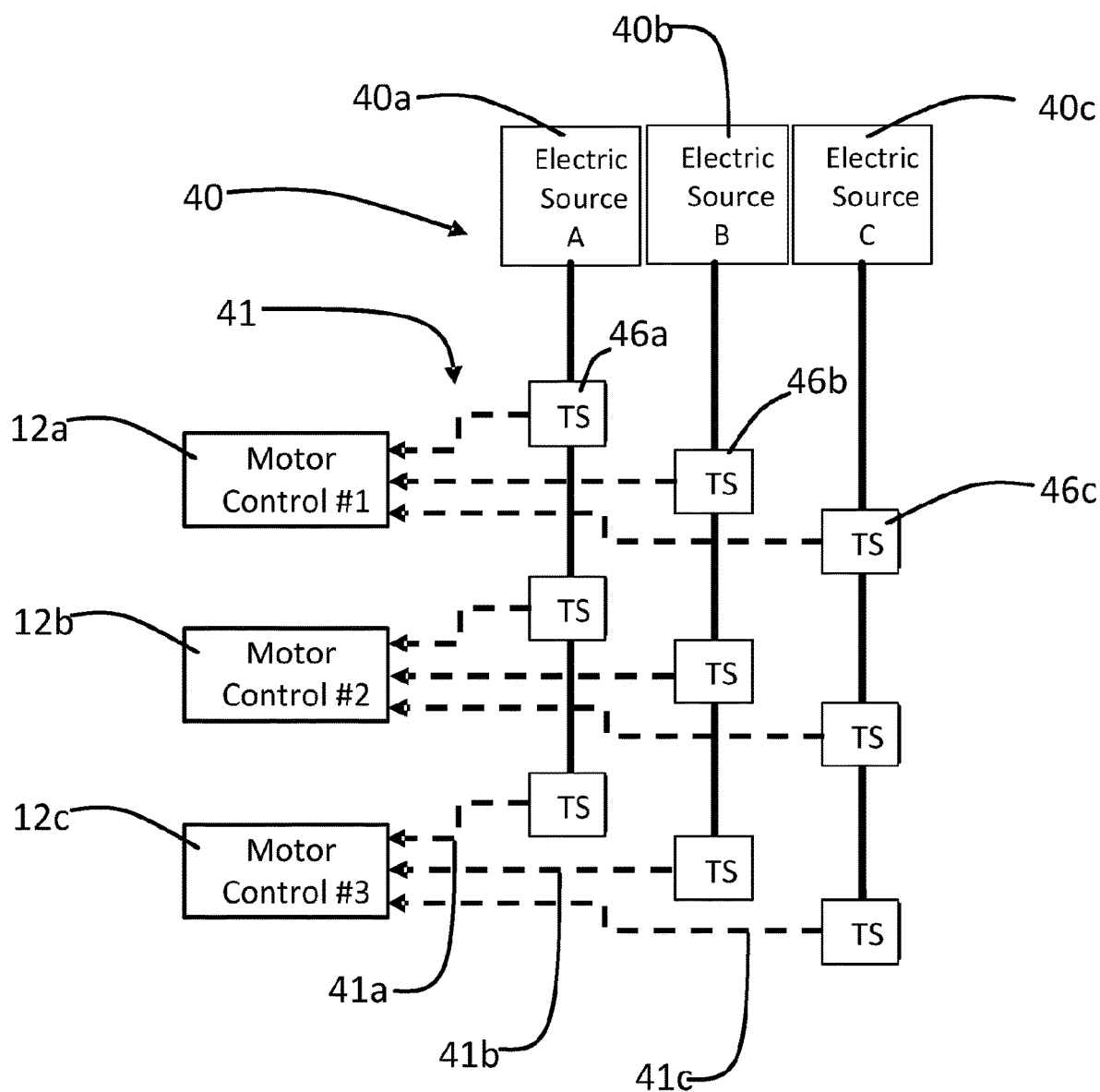
FIG. 1C is a schematic diagram of input power sources for a smart grid in accordance with the present invention.

FIGS. 1B and 1C are schematic diagrams of input power sources for a smart grid in accordance with embodiments of the present application. The schematic diagram of the exemplary embodiment in FIGS. 1B and 1C include a plurality of input power sources and a plurality of input switching devices, i.e., transfer switches, each operative to selectively connect at least one input power source to one of the controllers. Specifically, the diagram of FIG. 1C includes three input power sources 40, electric source A 40a, electric source B 40*b*, and electric source C 40*c*. Each input power source 40 may be connected to each of the three controllers 12 using conductors 41. Each controller 12 has a first conductor 41*a* coupled to a first transfer switch 46*a* that can selectively provide an electrical connection to electric source A 40*a*. Each controller 12 has a second conductor 41*b* coupled to a second transfer switch 46*b* that can selectively provide an electrical connection to electric source B 40*b*. Each controller 12 has a third conductor 41*c* coupled to a third transfer switch 46*c* that can selectively provide an electrical connection to electric source C 40*c*. Each of the motor controllers 12 may selectively be connected to any one of a plurality of input power sources 40 though the transfer switches 46 which may be similar to transfer switches 26, depending on the specific application.

Each input power source 40 may be coupled to each controller 12 so that input power to each of the controllers can be selected from any one of a plurality of input power sources using bus transfer switches 46. In this arrangement, each of the power sources 40*a*, 40*b*, 40*c* are available to each controller 12*a*, 12*b*, 12*c* through their respective transfer switches 46. When an input power source 40 is selected to drive a motor controller 12, the appropriate transfer switch 46 is closed from a normally open position allowing power to be transmitted between input power source 40 and the motor controller 12 through conductors 41. The exemplary system in FIG. 1B shows three power sources 40*a*, 40*b*, 40*c* and three motor controllers 12*a*, 12*b*, 12*c* with a total of nine transfer switches 46 to permit all combinations of input power source 40 and controller 12 to be connected. The connection scheme can be modified to accommodate any number of input power sources 40 and motor controllers 12 from one to many, through the appropriate application of transfer switches 46. In like manner, a reduced set of possible interconnects can be envisioned using a reduced set of transfer switches 46. This approach greatly increases the probability of having both electric power and a functioning motor controller available to operate any of the connected systems.

The power sources may be associated with any appropriate electric source of a vehicle. For example, in the context of an aircraft, electric source A 40*a* may be associated with a first normal electric power bus coupled to a first engine generator, electric source B 40*b* may be associated with a second normal electric power bus coupled to a second engine generator, and electric source C 40*c* may be associated with an emergency/critical power bus coupled to an auxiliary power unit (APU) generator and/or a battery power source. The emergency/critical power bus may be configured for short-term, high-reliability operations such as take-off and landing.

Figure 2:
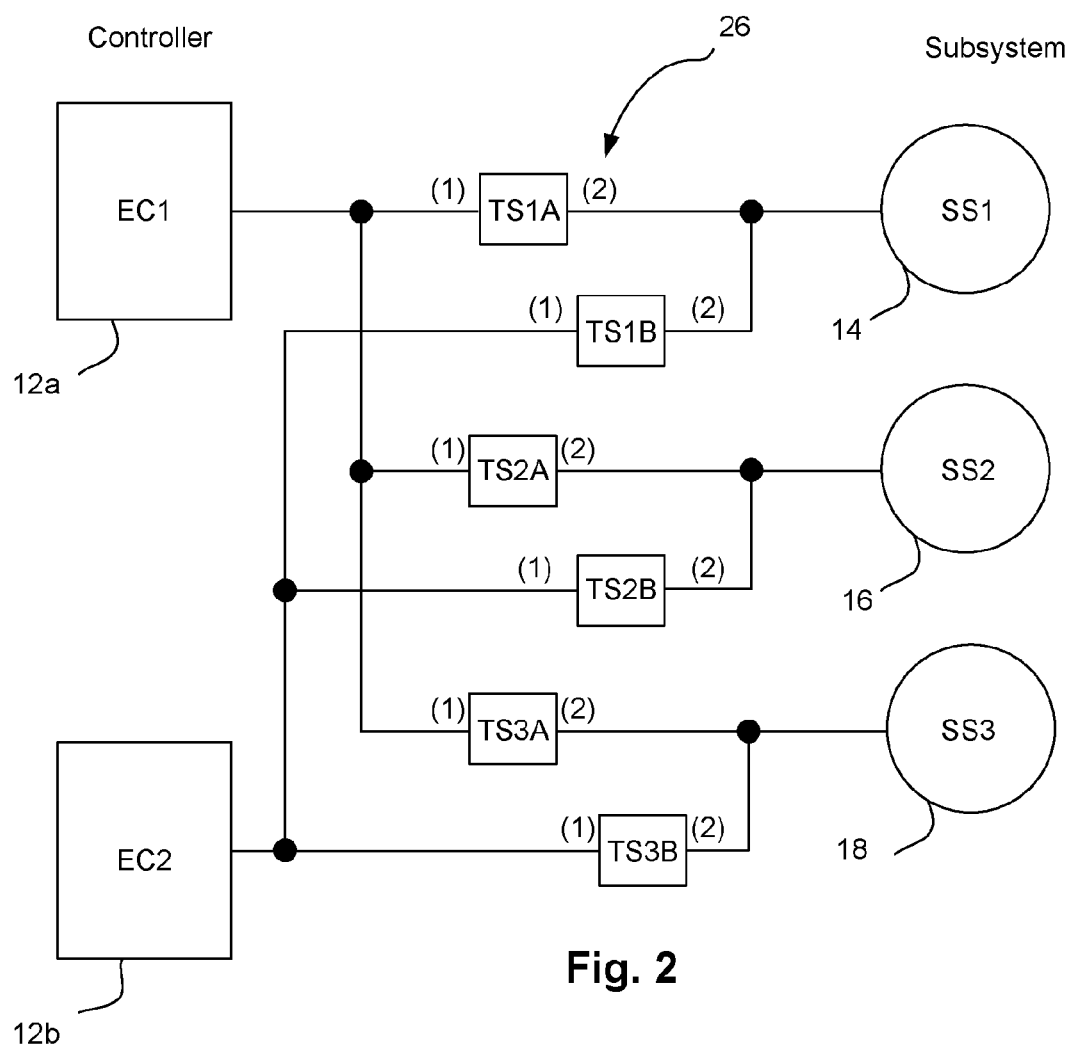
FIG. 2 is a schematic diagram illustrating an exemplary connection between a plurality of electronic controllers and a plurality of subsystems in accordance with the present invention.

Referring briefly to FIG. 2, illustrated is a simple connection diagram showing how two electronic controllers 12*a* and 12*b* may be connected to three subsystems 14, 16 and 18. It should be appreciated that the diagram of FIG. 2 is merely exemplary and there are numerous ways in which the respective transfer switches 26 and electronic controllers 12 may be connected to the subsystems 12, 14, 16.

As can be seen in FIG. 2, the first electronic controller 12*a* is connected to the input of transfer switches TR1A, TR2A and TR3A, while the second electronic controller 12*b* is connected to the input of transfer switches TR1B, TR2B and TR3B. The outputs of transfer switches TR1A and TR1B are connected to subsystem 14, the outputs of transfer switches TR2A and TR2B are connected to subsystem 16, and the outputs of transfer switches TR3A and TR3B are connected to subsystem 18. Thus, depending on the state of the respective transfer switches 26, each subsystem 14, 16, 18 can be connected to any one of electronic controllers 12*a*, 12*b*.

In an exemplary embodiment, the transfer switches shown in FIG. 2 to connect the subsystem 14 to one of the controllers 12*a*, 12*b* may be coupled to relay interlock logic. The relay interlock may be electromechanical, solid state, software, or a combination thereof. The command signal for interlock logic may be provided by the high-level controller 28 (e.g., a flight control computer), the electronic controller 12, or some other control device. The transfer switches may be normally open or normally closed depending on the application, controllers and/or sub-system coupled to the switch.

For example, in a first mode, TS1A and TS1B in FIG. 2 may be configured by the electronic controllers and/or the high-level controller 28 so that neither electronic controller 12*a* or 12*b* is connected to the subsystem 14. In a second mode, the electronic controllers and/or the high-level controller 28 then may select one of the electronic controllers 12*a*, 12*b* to operate the subsystem 14, e.g., it may select the second electronic controller 12*b* to operate the subsystem 14. In this regard, the electronic controller and/or the high-level controller 28 may set the transfer switch TS1A associated with the first electronic controller 12*a* to a an open state and set the transfer switch TS1B associated with the second electronic controller 12*b* to a closed state. As a result, the subsystem 14 is coupled to the second electronic controller 12*b*.

A person having ordinary skill in the art would appreciate that logic could be duplicated to connect the respective electronic controllers 12*a*, 12*b* to the subsystems 16 and 18, as well as modify the logic and connections to accommodate the inclusion of additional electronic controllers 12.

As is evident from FIG. 2, since the subsystems 14, 16, 18 can be connected to any one of electronic controllers 12*a*, 12*b*, the system provides redundant control of each subsystem 14, 16, 18. Depending on the availability requirements, the subsystems may be configured to connect to more than two electronic controllers such that a system with three electronic controllers could provide triple control redundancy for the attached subsystems.

To ensure that a failure of i) one electronic controller 12*a*, 12*b*, ii) a subsystem 14, 16, 18 and/or iii) associated wiring does not affect other electronic controllers and/or subsystems, system monitors and controller built-in-test can be included to prevent a failed system from damaging its associated controllers and/or subsystems. For example, feedback devices, such as current sensors, voltage sensors, continuity sensors, power factor sensors, arc fault sensors, and the like, can be utilized at the controller level, transfer switch level, and/or at the motor level to identify failure conditions, and the data from these sensors can be provided to the high-level controllers 28, transfer switches, and/or the electronic controllers 12. If a failure condition is detected, then connection of an electronic controller to a particular subsystem (or vice versa) can be inhibited, for example, by the high-level controller 28 and/or the electronic controller 12.

In one embodiment, the high-level controller 28 can directly command the transfer switches 26 to selectively couple certain subsystems to a particular electronic controller 12. For example, a control portion of each transfer switch 26 (e.g., a coil, a digital input, etc.) can be under direct control of the high-level controller (e.g., via a communication link between the high-level controller and the control portion of the transfer switch or via a digital output of the high-level controller connected to the control portion of the transfer switch).

In another embodiment, the high-level controller 28 indirectly provides commands to the transfer switches 26. For example, the high-level controller 28 may be directly connected to the electronic controller 12 (e.g., via a communication link), and the electronic controller 12 may be directly connected to the control portion of the transfer switch 26. Under such scenario, the high-level controller 28 can send a command to the electronic controller 12 indicating which subsystem is to be connected to the electronic controller 12. The electronic controller 12 then can command the appropriate transfer switches 26 to open and close, load and execute an operating sequence for the commanded subsystem and read the required feedback sensors for that subsystem. The operating sequence, control parameters and feedback signal map for each subsystem may be stored in each electronic controller 12 or may be stored remote from each controller (e.g., in the high-level controller 28 or other management system) and communicated to each electronic controller 12 as needed.

Figure 3A:
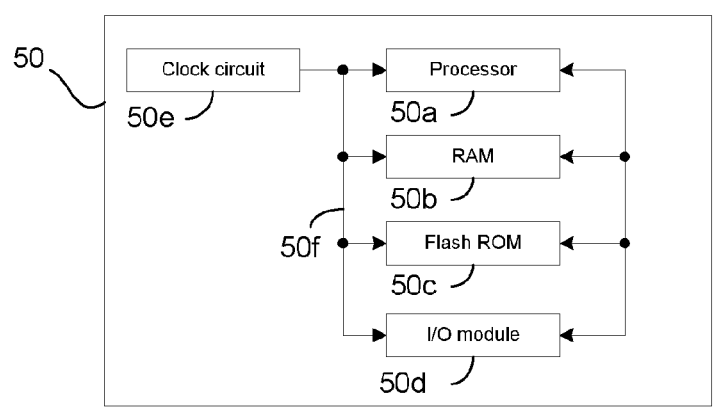
FIG. 3A is a block diagram of an exemplary high-level controller that can be used to implement control selection in accordance with the invention.

Referring to FIG. 3A, illustrated is a block diagram of an exemplary controller 50 that may be used in the system of FIG. 1A as the high-level controller 28. The controller 50 may be a microcomputer in which a CPU (central processing unit) 50a, a RAM (random access memory) 50b, a flash ROM (read only memory) 50c, an input/output module 50d, a clock circuit 50e and the like are communicatively connected via a system bus 50f. The controller 50 is responsible for controlling components of the system of FIG. 1A in accordance with the present invention. The RAM 50b is mainly used as a workspace, for example, for temporarily storing an intermediate result of processing. The flash ROM 50c stores, in advance, various programs to be executed by the CPU 36a and data to be used in processing. A management program may be stored in the flash ROM 50c, the management program being executable by the CPU 50a to carry out steps of a method in accordance with the invention. The I/O module 50d provides digital and/or analog input/output points for receiving and outputting data, while the clock circuit 50e can provide timing signals for the controller 50.

Although some embodiments have been discussed in terms of an electronic controller, the term electronic controller should be understood such that electronic controller can include a motor controller or other types of electronic controllers. Thus, the term electronic controller is not intended to denote a single electrical component but to encompass one or more electrical components configured to control the operation of an electrically actuated component.

Figure 3B:
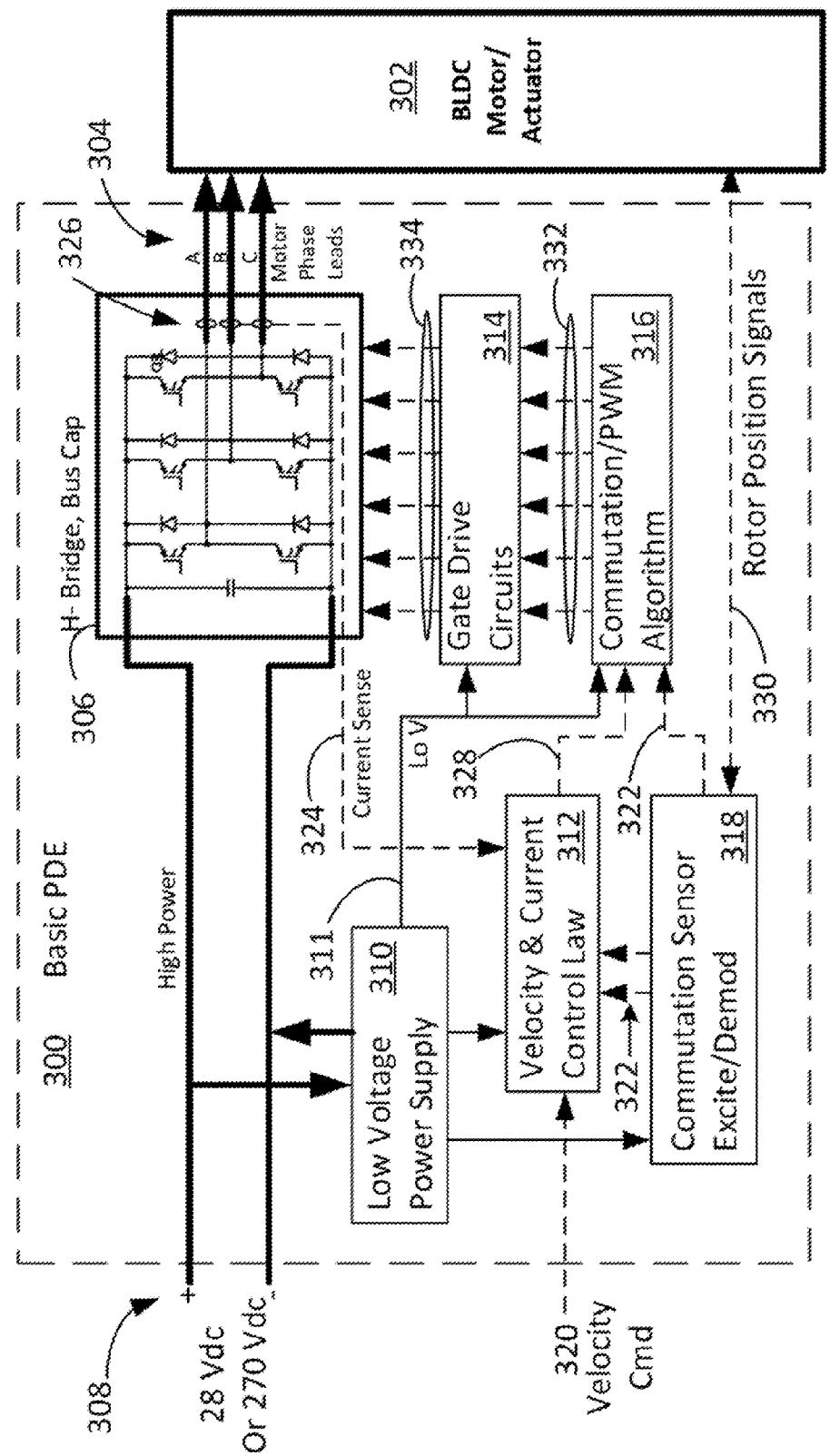
FIG. 3B is a block diagram of an exemplary electronic controller in accordance with the present invention.

FIG. 3B is a block diagram of an exemplary electronic controller in accordance with the present invention. The electronic controller 12 shown in FIG. 1 may be power distribution equipment such as a motor velocity control 300 shown in FIG. 3B. The motor velocity control 300 may be coupled to a motor/actuator 302 such as a brushless DC motor/actuator with one or more motor phase leads 304. The one or more motor phase leads 304 are coupled to an electronic circuit 306 configured to convert and control input power 308 for the motor/actuator 302. The input power 308 may be any suitable input for a particular application such as 28 Vdc, 270 Vdc, and the like. The input power 308 may include 3-phase inputs such as 115 Vac, 400 Hz; 115 Vac, variable Hz; 230 Vac, variable Hz and the like. In exemplary embodiments, the input power 308 may be coupled to a conversion module to convert the input power to a desired condition such as a 3-phase rectifier, an auto-transformer rectifier unit (ATRU), an active rectifier, and the like. In exemplary embodiments, a motor controller may include a regenerative absorption circuit to provide a dissipating path for regenerative energy, for example, a resistor and an insulated gate bipolar transistor for dissipating regenerative energy.

The motor velocity control 300 also includes a low-voltage control portion. The low-voltage control portion includes a low-voltage power supply 310 coupled to the input power 308. A low voltage signal 311 from the low-voltage power supply 310 is provided to a velocity and current control law module 312, one or more gate drive circuits 314, a commutation/pulse-width modulation (PWM) module 316, and a commutation sensor module 318. In exemplary embodiments, a motor controller may include additional modules depending on the application such as a position sensor module and/or a built-in-test/monitoring module.

Inputs to the velocity and current control law module 312 include a velocity command 320, commutation sensor data 322, and current data 324 from a current sense circuit 326 coupled to the motor phase leads 304. In exemplary embodiments, the velocity and current control law module may receive additional data such as position commands, position data associated with a component of an associated subsystem, and the like. The velocity and current control law module 312 processes the velocity command 320, the commutation sensor data 322, the current data 324 and any additional data to determine a velocity control signal 328 that is transmitted to the commutation/PWM algorithm module 316.

The commutation sensor module 318 receives rotor position signals 330 from the motor/actuator 302 and processes the signals to provide the commutation sensor data 322 to the velocity and current control law module 312 and the commutation/PWM algorithm module 316. The commutation sensor data 322 may be revolutions-per-minute, a frequency, or other appropriate variable associated with the motor 302 and/or a sub-system component for a particular application. The commutation/PWM algorithm module 316 processes the velocity control signal 328 and the commutation sensor data 322 to generate one or more gate drive control signals 332 for the one or more gate drive circuits 314. The gate drive circuits 314 provide one or more control signals 334 corresponding to the gate drive control signals 332 to each gate drive in the electronic circuit 306 to control the power output on the motor phase leads 304 to control the motor/actuator 302.

Controllers 50, 300, and/or 350 may include a computer system, an application specific integrated circuit (ASIC), a microprocessor, a field programmable gate array (FPGA), and the like. Embodiments described herein can be implemented by, for example, hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine-readable medium such as a storage medium. One or more of the modules of controllers 50, 300, and/or 350 may be stand-alone modules or implemented together on an ASIC, processor, FPGA, etc. The one or more modules of controllers 50, 300, and/or 350 may be implemented using software that executes in a processor, ASIC, FPGA, etc. Controllers 50, 300, and/or 350 may include a computer readable medium storing instructions for executing the associated modules to perform any of the features described herein.

Figure 4:
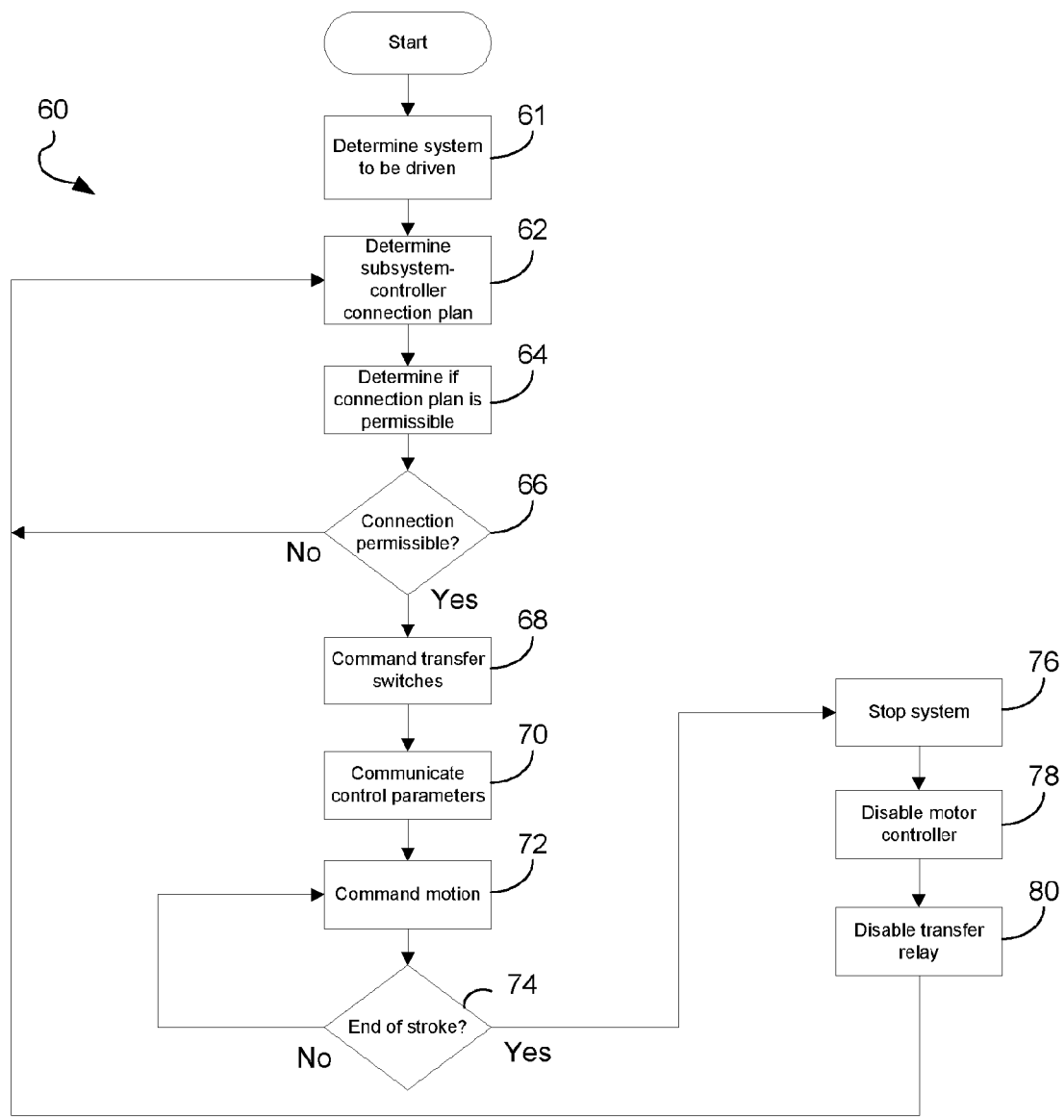
FIG. 4 is a flow chart illustrating exemplary steps of a method in accordance with the invention.

Referring now to FIG. 4, illustrated is a flow diagram 60 that depicts exemplary steps for selectively connecting a subsystem to any one of a plurality of electronic controllers 12 in accordance with the invention. Although the method descriptions and flow chart may show specific orders of executing steps, the order of executing the steps may be changed relative to the order described. Also, two or more steps described in succession may be executed concurrently or with partial concurrence. One or more of the described or illustrated steps may be omitted and other steps added as required to meet system requirements.

The exemplary method of FIG. 4 may be implemented using coded instructions (e.g., computer readable instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Typical non-transitory computer readable media include electronic memory devices, magnetic memory devices and optical memory devices. The method may be executed at least partially by a controller, such as electronic controller 12 and/or high-level controller 28. In one embodiment, to carry out the method, the logical instructions embodying the method are stored in flash memory 50c and executed by the processor 50a of the controller 50. Alternatively, the method may be at least partially implemented in hardware of the controller 50 (e.g., an application-specific integrated circuit (ASIC), analog circuitry, or the like).

The method 60 may begin at step 61 where the motor(s), i.e., electronic controllers and subsystems, to be connected are determined by a command from some higher-level system or control requests from a user, etc. For example, if the aircraft is preparing for landing, the pilot may set the trailing edge flaps to a first position. Next at step 62 a connection plan for the subsystems and electronic controllers is determined. Such connection plan may be based on specific operational phases of the aircraft. For example, the high-level controller 28, based on the pilot's request, can assign one of the available electronic controllers 12 to the trailing edge flap subsystem 18. Additionally, the high-level controller 28 may determine an appropriate input power for the available electronic controller and determine which power bus can support that power.

Next at steps 64 and 66 it is determined if the connection plan is permissible. In determining if a connection plan is permissible, the status of the input power source, each subsystem, electronic controller, and power source may be evaluated to determine if the systems are operating normal or abnormal (fault) and determine that the desired input power source, electronic controllers 12 and transfer switches 26 are free to be used, and determine that the electrical load applied to a single power source will not overload the power source. If the input power source, subsystem, transfer switches and electronic controller selected by the connection plan are all normal, then the connection plan is permissible, while if any one of the systems are abnormal then the connection plan is not permissible.

If the connection plan is permissible, then the method moves to step 68 and the transfer switch corresponding to the selected electronic controller is activated and the subsystem is connected to the electronic controller. For example, if an engine generator power source, the trailing edge flap subsystem 18, and the transfer switches coupling the subsystem to the desired electronic controller 12 are operating normal, the transfer switches are activated to connect the trailing edge flap subsystem 18 to the desired electronic controller 12 and the power source. If the connection plan is not permissible, then the method moves back to step 62 and a new plan is determined.

For example, if the engine generator power source is not available, the method moves back to step 62, and a second connection plan associated with a second power source is determined. Next, the method repeats steps 64 and 66 to determine if the second connection plan is permissible. In determining if the second connection plan is permissible, the status of the second power source, the trailing edge flap subsystem 18, and the electronic controllers 12 may be evaluated to determine if the systems are operating normal or abnormal (fault) and determine that the second power source, electronic controllers 12 and transfer switches 26 are free to be used. If the second power source, trailing edge flap subsystem 18, transfer switches and electronic controller selected by the second connection plan are all normal, then the second connection plan is permissible. If the connection plan is permissible, then the method moves to step 68 and the transfer switches corresponding to the second power source and the selected electronic controller are activated, and the trailing edge flap subsystem is connected to the electronic controller and the second power source.

Next at step 70, control parameters for the particular subsystem are retrieved by the electronic controller 12. These control parameters may be obtained from memory of the electronic controller 12 or communicated to the electronic controller 12 from a remote device (e.g., the high-level controller 28). For example, control parameters associated with the trailing edge flap subsystem 18 are retrieved by the electronic controller from memory associated with electronic controller 12 and/or the high-level controller 28. The electronic controller 12 may be configured to verify control parameters with one or more additional controllers in the smart grid system.

At step 72 the electronic controller 12 provides the desired output to the subsystem to cause the desired motion. Continuing the previous example, the electronic controller 12 provides an output to the trailing edge flap subsystem 18 corresponding to the pilot setting the trailing edge flaps to the first position. The desired output causes movement of the trailing edge flap to the first position.

In step 74 the electronic controller 12 monitors the system position (or other feedback) to determine when the end of stroke is achieved. For example, the electronic controller 12 may receive signals from one or more feedback sensors associated with the trailing edge flap subsystem 18. The electronic controller may process the received signals to monitor the position of the trailing edge flap to determine the trailing edge flap is in the desired position, i.e., the first position set by the pilot.

Once the end of stroke is achieved, the control moves to step 76 and drives the system to the desired stop condition. For example, the electronic controller 12 may determine the trailing edge flap is in the desired position and stops the system in the first position.

At step 78 the motor controller 12 is disabled and then at step 80 the transfer switch/relay is disabled. To disable the motor controller 12, the input power may be disconnected using a transfer switch. The method then moves back to step 62 and repeats.

Although some embodiments have been discussed in terms of the engine generator power source, electronic controllers, and the trailing edge flap subsystem, the terms should be understood such that input power source, controller, and subsystem can include a number of input sources, controllers, and subsystems that can be used to form a smart power grid for multiple electric actuation systems. Thus, the terms are not intended to denote a single source, controller, or subsystem, but encompass one or more sources, controllers, and/or subsystems used in a smart power grid. One of ordinary skill in the art would recognize many variations, modifications, and alternatives.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A control system, comprising:
    a plurality of subsystems each operative to perform a unique function;
    at least one controller operative to individually control at least one of the plurality of subsystems,
    wherein a number of the at least one controller is less than a number of the plurality of subsystems on the vehicle;
    a plurality of switching devices each operative to selectively connect any subsystem of the plurality of subsystems to any controller of the at least one controller;
    a plurality of input power sources; and
    a plurality of input switching devices, wherein each input switching device is operative to selectively connect any controller of the at least one controller to any input power source of the plurality of input power sources.

2. The control system according to claim 1, further comprising a high-level controller operatively coupled to the plurality of switching devices, the high-level controller configured to selectively command the plurality of switching devices to connect any subsystem of the plurality of subsystems to any controller of the at least one controller.

3. The control system according to claim 2, wherein the high-level controller is operatively coupled to the plurality of input switching devices, the high-level controller configured to selectively command the plurality of input switching devices to connect any controller of the at least one controller to any input power source of the plurality of input power sources.

4. The control system according to claim 3, wherein the high-level controller is directly coupled to each of the plurality of switching devices and each of the plurality of input switching devices.

5. The control system according to claim 3, wherein the high-level controller is indirectly coupled to each of the plurality of switching devices and each of the plurality of input switching devices.

6. The control system according to claim 5, wherein the high-level controller is communicatively coupled to the at least one controller, and the at least one controller is directly coupled to at least one of the switching devices.

7. The control system according to claim 2, wherein the high-level controller comprises a plurality of high-level controllers, wherein each high-level controller of the plurality of high-level controllers is operative to selectively command the plurality of switching devices to connect any subsystem of the plurality of subsystems to any controller of the at least one controller.

8. The control system according to claim 1, wherein the high-level controller comprises a flight control computer.

9. The control system according to claim 1, wherein the high-level controller is communicatively coupled to the plurality of controllers and configured to provide control parameters to each controller based on the subsystem connected to the respective controller.

10. The control system according to claim 1, wherein the plurality of subsystems comprises at least one of a thrust reverser, a leading-edge slat; a trailing edge flap, a spoiler, wing fold, a cargo door, a landing gear door, and an electrically actuated component.

11. The control system according to claim 1, wherein the controllers comprise a motor drive controller.

12. The control system according to claim 11, wherein the motor drive controller comprises a variable frequency AC motor drive, a brushless DC drive, or other type of motor drive.

13. The control system according to claim 1, wherein the plurality of switching devices comprises at least one of a solid-state switch and an electro-mechanical relay.

14. A method for controlling a plurality of subsystems on a vehicle using a plurality of electronic controllers on the vehicle, wherein a number of the plurality of electronic controllers on the vehicle is less than a number of the plurality of subsystems on the vehicle, the method comprising selectively connecting any one of the plurality of subsystems to any one of the plurality of electronic controllers, and selectively connecting any input power source of a plurality of input power sources to any electronic controller of the plurality of electronic controllers.

15. The method according to claim 14, wherein a plurality of switching devices of the vehicle are each operative to selectively connect any subsystem of the plurality of subsystems to any electronic controller of the plurality of electronic controllers, and wherein selectively connecting further comprises using a high-level controller to selectively command the plurality of switching devices to connect any subsystem of the plurality of subsystems to any electronic controller of the plurality of electronic controllers.

16. The method of claim 15 wherein a plurality of input switching devices are each operative to selectively connect any input power source of the plurality of input power sources to each of the plurality of electronic controllers, and wherein selectively connecting further comprises using the high-level controller to selectively command the plurality of input switching devices to connect any input power source of the plurality of input power sources to each of the plurality of electronic controllers.

17. The method according to claim 16, wherein using the high-level controller includes the high-level controller directly commanding each of the plurality of switching devices and each of the plurality of input switching devices.

18. The method according to claim 16, wherein using the high-level controller includes the high-level controller indirectly commanding each of the plurality of switching devices and each of the plurality of input switching devices.

19. The method according to claim 14, further comprising providing control parameters to each electronic controller of the plurality of electronic controllers based on the subsystem connected to a respective electronic controller.

20. A controller for controlling a plurality of subsystems on a vehicle using one or more electronic controllers on the vehicle, wherein a number of the one or more electronic controllers on the vehicle is less than a number of the plurality of subsystems on the vehicle, wherein a plurality of switching devices of the vehicle are each operative to selectively connect any one of the plurality of subsystems to any one of the one or more electronic controllers, and wherein a plurality of input switching devices are each operative to selectively connect any controller of the one or more of electronic controllers to any input power source plurality of input power sources, each of the one or more electronic controllers comprising logic configured to command the plurality of switching devices to selectively connect any one of the plurality of subsystems to any one of the one or more electronic controllers, and to command the plurality of input switching devices to selectively connect the any controller of the one or more electronic controllers to any input power source of the plurality of input power sources.

* * * * *